(12) United States Patent
Hayashi

(10) Patent No.: US 8,616,515 B2
(45) Date of Patent: Dec. 31, 2013

(54) SLIDE RAIL DEVICE FOR VEHICLE

(75) Inventor: Naoki Hayashi, Fujisawa (JP)

(73) Assignee: Shiroki Corporation, Fujisawa-shi (JP)

( * ) Notice: Subject to any disclaimer, the term of this patent is extended or adjusted under 35 U.S.C. 154(b) by 0 days.

(21) Appl. No.: 13/604,720

(22) Filed: Sep. 6, 2012

(65) Prior Publication Data

US 2013/0119222 A1 May 16, 2013

Related U.S. Application Data

(63) Continuation of application No. PCT/JP2011/059402, filed on Apr. 15, 2011.

(30) Foreign Application Priority Data

Apr. 28, 2010 (JP) ................... 2010-104572

(51) Int. Cl.
*F16M 13/00* (2006.01)

(52) U.S. Cl.
USPC ........ 248/429; 248/424; 248/430; 296/65.13; 297/344.1

(58) Field of Classification Search
USPC ................. 248/424, 429, 430; 297/344.1; 296/65.13
See application file for complete search history.

(56) References Cited

U.S. PATENT DOCUMENTS

| | | | | |
|---|---|---|---|---|
| 6,902,235 B2* | 6/2005 | Rohee et al. | ........... | 297/334 |
| 7,314,204 B2* | 1/2008 | Kohmura | .............. | 248/430 |
| 7,717,392 B2* | 5/2010 | Sakakibara et al. | ......... | 248/429 |
| 7,717,490 B2* | 5/2010 | Kojima et al. | ............ | 296/65.13 |
| 8,474,777 B2* | 7/2013 | Nihonmatsu et al. | ......... | 248/429 |
| 2001/0015401 A1* | 8/2001 | Yoshida et al. | ............. | 248/430 |
| 2002/0060281 A1* | 5/2002 | Okazaki et al. | ............. | 248/424 |
| 2003/0006355 A1* | 1/2003 | Horsfield et al. | ............ | 248/429 |
| 2005/0103968 A1* | 5/2005 | Yamada et al. | ............. | 248/429 |
| 2011/0121154 A1* | 5/2011 | Kimura et al. | .............. | 248/429 |
| 2013/0134281 A1* | 5/2013 | Naoki | ......................... | 248/430 |
| 2013/0168524 A1* | 7/2013 | Aoi | .............................. | 248/430 |
| 2013/0206952 A1* | 8/2013 | YAMADA et al. | ......... | 248/429 |

FOREIGN PATENT DOCUMENTS

| | | |
|---|---|---|
| JP | 50-12817 S | 4/1975 |
| JP | 2005-67557 A | 3/2005 |
| JP | 2008-265695 A | 11/2008 |

* cited by examiner

*Primary Examiner* — Anita M King
(74) *Attorney, Agent, or Firm* — Millen, White, Zelano, Branigan, P.C.

(57) ABSTRACT

The slide rail device includes a lock release lever which switches a locking mechanism between a slide restriction state and a slide restriction release state by rotating in the vertical direction and includes a rail-incorporated portion positioned between an upper rail and a bottom wall of a lower rail, a rotational contact portion which is formed on an upper surface of the rail-incorporated portion and contacts a roof surface of the upper rail, and a biaser which is installed in the rail-incorporated portion and the upper rail and biases the rotational contact portion toward the roof surface.

7 Claims, 10 Drawing Sheets

SLIDE RAIL DEVICE FOR VEHICLE

RELATED APPLICATION DATA

This is a continuation of International Application No. PCT/JP2011/059402, with an international filing date of Apr. 15, 2011, which is herein incorporated by reference in its entirety.

TECHNICAL FIELD

The present invention relates to a slide rail device for a vehicle which supports a seat in a slidable manner.

BACKGROUND ART

As a prior art slide rail device for vehicle, a device is known which is equipped with a left and right pair of lower rails which include a plurality of convex teeth (lock teeth) extending and arranged in a forward/rearward direction and which are fixed to a vehicle interior floor, a left and right pair of upper rails which support the seating portion of a seat and are slidably supported by the left and right pair of lower rails, locking levers which are accommodated in the internal spaces of the upper rails and which are supported by the upper rails to be rotatable in the vertical direction between a lock position to be engaged with the aforementioned convex teeth and an unlock position to release the engagement with the convex teeth, wire springs (biaser) which bias and rotate the locking levers toward the lock position, and an operating lever, the rear end of which is fixed to the locking levers and the front end of which projects toward the front of the upper rails.

Therefore, when an occupant applies no operating force to the operating lever, the slide positions of the seat and the upper rails with respect to the lower rails are maintained since the lock levers which are held in the lock position by the wire springs are engaged with some of the convex teeth. On the other hand, upon a passenger operating the operating lever to rotate the lock levers to the unlock position against the biasing force of the wire springs, the lock levers are disengaged from the convex teeth to thereby allow the seat and the upper rails to slide with respect to the lower rails.

CITATION LIST

Patent Literature

PATENT LITERATURE 1: Japanese Unexamined Patent Publication No. 2008-265695

SUMMARY OF THE INVENTION

Technical Problem

In the slide rail device for vehicle that has the above described structure, both left and right ends of a support shaft (rotational shaft) fixed to a roof portion of an upper rail are fitted into through-holes formed through both left and right walls of the upper rail, and the operating lever is biased to rotate by a wire spring after a bearing hole formed in the operating lever is rotatably fitted on the support shaft.

However, the support shaft, which is a separate member from the upper rail and the operating lever, is required; moreover, the through-holes need to be formed in the upper rail, and therefore, the number of components is large and the structure is complicated.

The present invention provides a slide rail device for a vehicle in which a lock release lever can be rotatably supported by an upper rail with a simple structure and with a small number of components, even though a locking mechanism and the lock release lever are installed in an internal space of the upper rail.

Solution to Problem

A slide rail device for vehicle according to the prevent invention is characterized by including a lower rail which extends in a forward/rearward direction; an upper rail which is supported by the lower rail to be slidable in the forward/rearward direction; a locking mechanism which is provided between the upper rail and the lower rail and restricts or releases a restriction on sliding of the upper rail; a lock release lever which switches the locking mechanism between a slide restriction state and a slide restriction release state by rotating in a vertical direction and includes a rail-incorporated portion positioned between the upper rail and a bottom wall of the lower rail; a rotational contact portion which is formed on an upper surface of the rail-incorporated portion, contacts a roof surface of the upper rail and rotatably supports the lock release lever; and a biaser which is installed in the rail-incorporated portion and the upper rail, the biaser biasing the rotational contact portion toward the roof surface.

It is desirable for the rotational contact portion to include a protrusion which protrudes upward.

The locking mechanism can include a plurality of lock grooves which are formed in the lower rail and aligned in the forward/rearward direction; and a lock portion which is engaged in any one of the lock grooves when the lock release lever is in a lock position and escapes from the lock groove when the lock release lever is in an unlock position.

The biaser can include a lock spring including the lock portion.

The biaser can be a torsion spring, wherein the torsion spring prevents the lock release lever from moving forward and rearward relative to the upper rail.

Furthermore, the torsion spring includes a lock portion which is engaged in any one of a plurality of lock grooves formed in the lower rail to be aligned in the forward/rearward direction when the lock release lever is positioned in a lock position, and the lock portions which escapes from the lock groove when the lock release lever is positioned in an unlock position, and wherein the lock release lever includes a first engaging portion which is engaged with the torsion spring at a portion in the vicinity of the lock portion and a second engaging portion which is engaged with the torsion spring at a portion thereof which deviates from the first engaging portion in the forward/rearward direction.

A portion of the rail-incorporated portion can be formed as a narrow-width portion which is smaller in width than the surrounding portion of the rail-incorporated portion, and at least part of the biaser is positioned in a space formed between the upper rail and both sides of the narrow-width portion.

Advantageous Effects of the Invention

According to the present invention, the rotation support structure for the lock release lever with respect to the upper rail has small number of components and is simple in structure because the upper rail is not provided with a rotational shaft for rotatably supporting the lock release lever.

DESCRIPTION OF EMBODIMENTS

Figure 1:
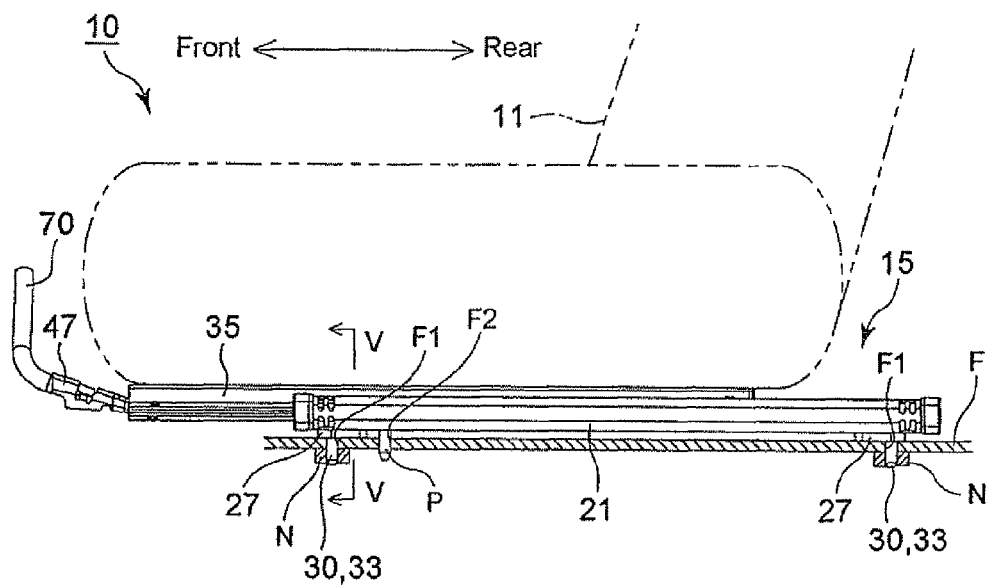
FIG. 1 is a side view of a slide seat device when upper rails in an embodiment of the present invention have slid to the front end position.

An embodiment of the present invention will be hereinafter discussed with reference to FIGS. 1 through 19. Directions described in the following description are defined based on the directions of arrows shown in the drawings.

A slide seat device 10 is installed onto a floor board F (see FIG. 1) that constitutes a vehicle interior floor of an automobile (vehicle) not shown in the drawings. Four screw holes (two front and rear left holes and two front and rear right holes) F1 are formed through the floor board F for one slide seat device 10, and four weld nuts N which are coaxial with the four screw holes F1 are fixed to a lower surface of the floor board F at positions corresponding to the four screw holes F1, respectively. In addition, positioning holes F2 are formed through the floor board F at positions immediately behind the front screw holes F1, respectively. The slide seat device 10 is provided with a slide rail device 15 that constitutes a lower part of the slide seat device 10, and a seat 11 which is fixed to upper surfaces of the slide rail device 15 (upper rails 35).

The detailed structure of the slide rail device 15 will be discussed hereinafter.

The slide rail device 15 is provided, as large components thereof, with a left and right pair of rail units 20 and a loop handle 70 which connects the front ends of the left and right rail units 20. The left and right rail units 20 have the same structure while the loop handle 70 has a bilaterally-symmetrical shape, and therefore, the slide rail device 15 is bilaterally symmetrical as a whole.

The left and right rail units 20 have the structure which will be discussed hereinafter.

Figure 3:
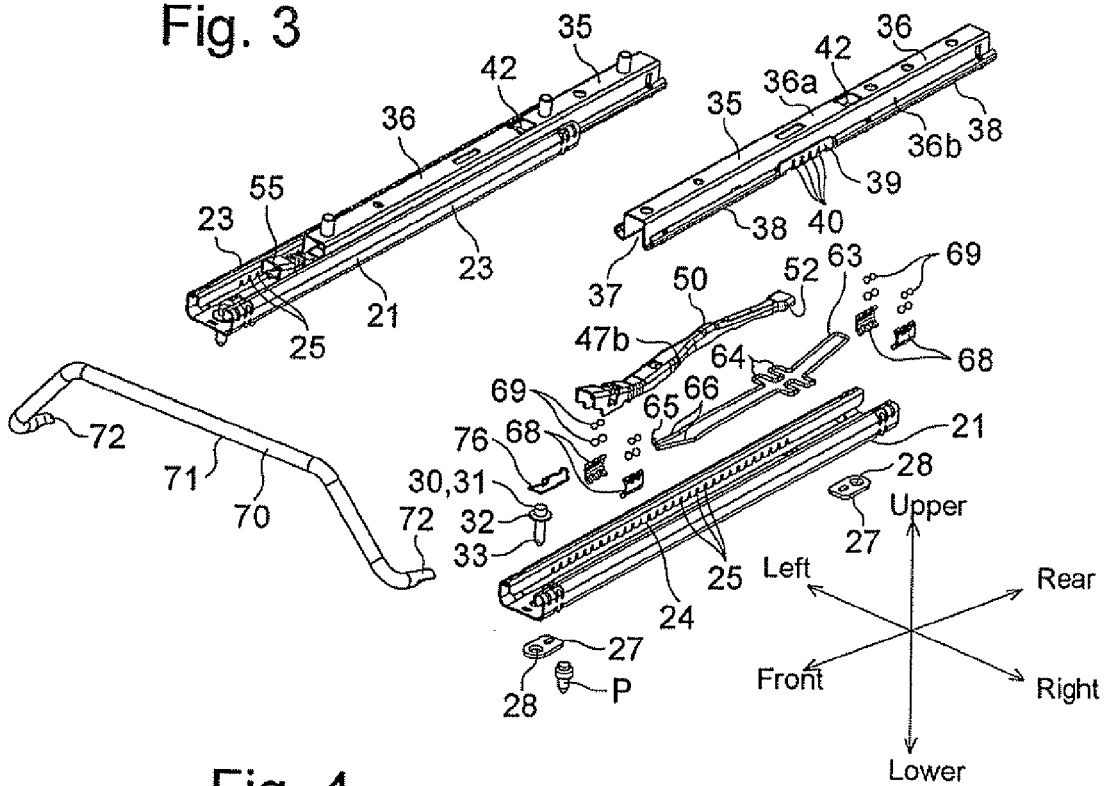
FIG. 3 is an exploded perspective view of the slide rail device, viewed obliquely from above.
Figure 4:
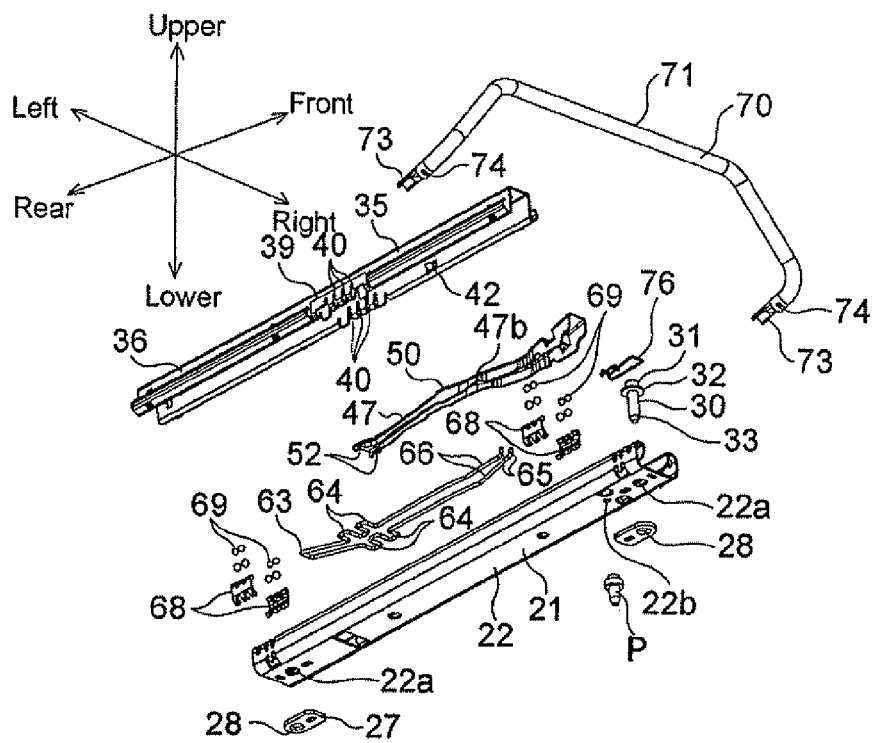
FIG. 4 is an exploded perspective view of the slide rail device with the left rails omitted, viewed obliquely from below.
Figure 10:
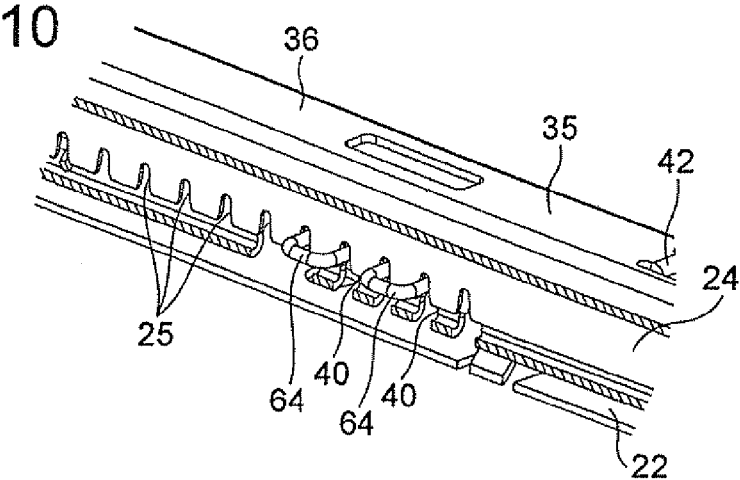
FIG. 10 is an enlarged perspective view of one upper rail and the associated lower rail in a locked state with an outer side wall of the lower rail, and an upright wall and a locking wall of the upper rail cut out.

Each rail unit 20 is provided with a lower rail 21 which is placed on the floor board F. The lower rail 21 is a metal-made channel member which extends in the forward/rearward direction and the top thereof is open, and is provided with a substantially-horizontal bottom wall 22, a left and right pair of outer wall portions 23 which extend upward from the left and right sides of the bottom wall 22, respectively, and left and right pair of inner wall portions 24 which extend inward and thereafter downward from the top edges of the left and right pair of outer wall portions 23, respectively. As shown in FIGS. 3 and 10, etc., a large number of lock grooves 25 are formed in the lower edges of the left and right inner walls 24 and are aligned in the forward/rearward direction. In addition, as shown in FIG. 4, a pair of bolt insertion holes 22a are formed through the bottom wall 22 in the vicinity of both front and rear ends of the bottom wall 22, respectively, and a positioning hole 22b is formed through the bottom wall 22 immediately behind the front bolt insertion hole 22a. Two spacers 27 are fixed to the undersurface of the bottom wall 22 in the vicinity of both front and rear ends thereof, respectively, and through-holes 28 formed through the two spacers 27 are coaxial with the bolt insertion holes 22a, respectively.

A front and rear pair of fixing bolts (fixing members) 30 are inserted into the front and rear bolt insertion holes 22a of the bottom wall 22 from above, respectively. Each fixing bolt 30 is provided with a head (projection portion) 31 which constitutes the upper end of the fixing bolt 30, a flange 32 which is greater in diameter than the head 31 and the associated bolt insertion hole 22a and joined to the lower end of the head 31, and a threaded portion 33 which extends downward from a lower surface of the flange 32 and is slightly smaller in diameter than the associated bolt insertion hole 22a and through-hole 28.

Figure 6:
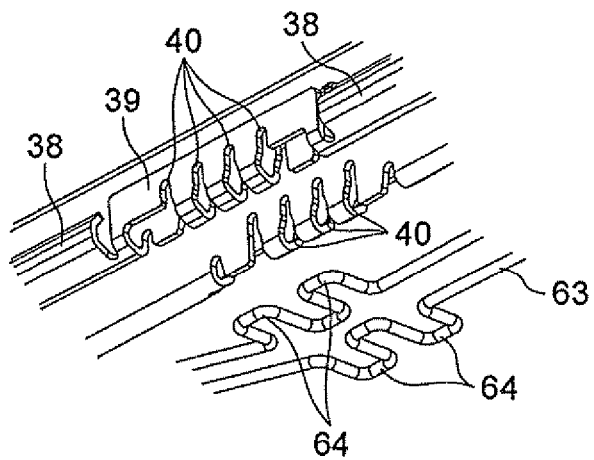
FIG. 6 is an enlarged perspective view of middle parts of one upper rail and a lock spring in a mutually separated state, viewed obliquely from below.
Figure 7:
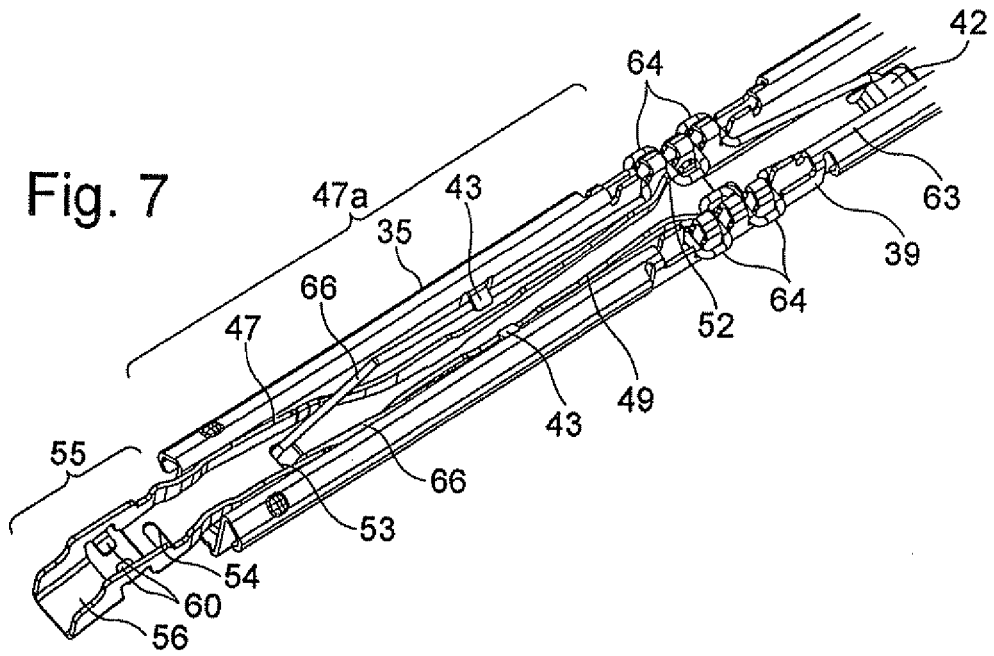
FIG. 7 is a perspective view of one upper rail, a lock release lever and the lock spring in an assembled state, viewed obliquely from below.

Each rail unit 20 is provided with an upper rail 35 that is slidable in the forward/rearward direction with respect to the associated lower rail 21. The upper rail 35 is a metal channel member which extends in the forward/rearward direction and the bottom thereof is open, and is provided with a base 36 (provided with a substantially-horizontal roof portion 36a and a pair of side wall portions 36b which extend downward from both left and right sides of the roof portion 36*a*) which is substantially inverted U-shaped in cross section and the internal space of which constitutes a lever accommodating groove 37, upright walls 38 which extend upward from the side wall portions 36*b* except central portions thereof in the longitudinal direction, and locking walls 39 which extend upward from the aforementioned central portions of the side wall portions 36*b*. As shown in FIGS. 3, 4 and 6, etc., four guide grooves 40 are formed through the lower edges of the left and right locking walls 39 and the lower edges of the side walls of the base 36 to extend upward. In addition, as shown in FIGS. 3 and 7, etc., the base 36 is provided, in the vicinity of a central portion of the roof portion 36*a*, with a locking lug 42 which is formed by cutting and raising a portion of the base 36 to extend downward and subsequently rearward, and is provided, on portions of the left and right side wall portions 36*b* which are positioned slightly in front of central portions of the left and right side wall portions 36*b*, with locking lugs 43 which are formed by cutting and raising portions of the left and right side wall portions 36*b* to extend inward.

Each rail unit 20 is further provided with a lock release lever 47 and a lock spring 63 that are installed in the associated upper rail 35.

The lock release lever 47 is a press-molded product formed from a metal plate and also a metal channel member which extends in the forward/rearward direction and the bottom thereof is open, and is provided with a base wall 47*d* and side walls 51 which extend downward from both left and right side edges of the base wall 47*d*. The lock release lever 47 has a substantially inverted U-shaped cross section over the length thereof, a portion of the lock release lever 47 immediately in front of a central portion thereof in the longitudinal direction thereof constitutes a middle portion 48, the internal space of which forms a receptive depressed portion 48*a*, and a portion of the lock release lever 47 immediately behind the middle portion 48 is formed as a narrow-width portion 49 which is narrower in width than portions of the lock release lever 47 which are positioned in front and behind the narrow-width portion 49. In addition, ridges 47*b* which are formed on outer side surfaces (outer side surfaces in the vicinity of the joint between the middle portion 48 and the narrow-width portion 49) of the left and right side walls 51 to extend in the vertical direction are formed as R-planes (see FIGS. 3, 4, 8, 9 and 13). As shown in FIGS. 3, 4, 8 and 9, a rotational contact protrusion 50 which extends in the leftward/rightward direction is protruded from an upper surface of the lock release lever 47. In addition, spring-hook grooves 52 are formed on lower surfaces of the left and right side walls 51 of the lock release lever 47 in the vicinity of the rear ends of the left and right side walls 51, and a lock-spring catching hole 53 and a lock-spring catching hole 54 are formed through the base wall 47*d* of the lock release lever 47. Additionally, ridges 52*a* substantially identical in shape to the ridges 47*b* are formed on the left and right side walls 51 immediately in front of the spring-hook grooves 52, respectively (see FIGS. 8, 9 and 13). A portion of the lock release lever 47 which is positioned in front of the middle portion 48 constitutes a connecting portion 55 that is greater in width than the middle portion 48, and a portion of the lock release lever 47 which is positioned behind the connecting portion 55 constitutes a rail-incorporated portion 47*a*. The lower surface of the roof of the front end of the connecting portion 55 is formed as a flat front limit portion 56, and a space immediately below the front limit portion 56 constitutes a front allowance space 57. In addition, a depressed portion 58 is formed on the connecting portion 55 at a position immediately behind the front limit portion 56, and the space created by the depressed portion 58 constitutes a rear allowance space 59. Furthermore, substantially-horizontal rear limit lugs 60 (the upper surfaces of which constitute rear limit portions 60*a*) which extend in directions to approach each other are projected from the left and right lower edges of the depressed portion 58. Furthermore, a combination of the front allowance space 57 and the rear allowance space 59 constitutes a connecting space 61.

The lock spring 63 is a substantially bilaterally-symmetrical member formed by bending a metal wire rod. A pair of front and rear lock portions 64 which extend substantially horizontally outwards are formed on portions of both left and right side portions of the lock spring 63 which are positioned slightly behind central portions thereof in the longitudinal direction, respectively. A portion of the lock spring 63 which is positioned behind the lock portions 64 extends obliquely rearwardly upwards from the lock portions 64 when in a free state, and a portion of the lock spring 63 which is positioned in front of the lock portions 64 extends obliquely forwardly upwards when in a free state. The lock spring 63 is provided at the front end thereof with a left and right pair of front-end locking lugs 65 which project upward, and portions of the lock spring 63 which are positioned immediately behind the front-end locking lugs 65 constitute lever pressing portions 66.

Figure 8:
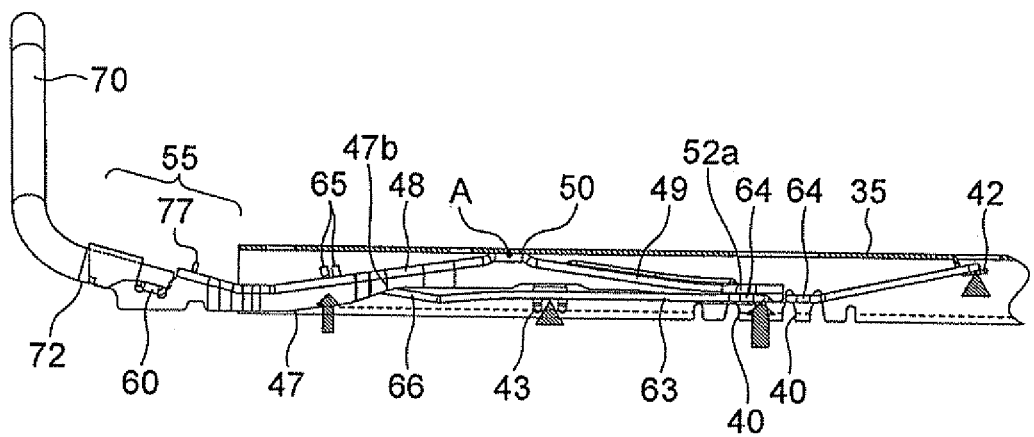
FIG. 8 is a side view of one upper rail and the lock release lever and a loop handle in a locked state, wherein only the upper rail is shown as a longitudinal sectional side view.
Figure 9:
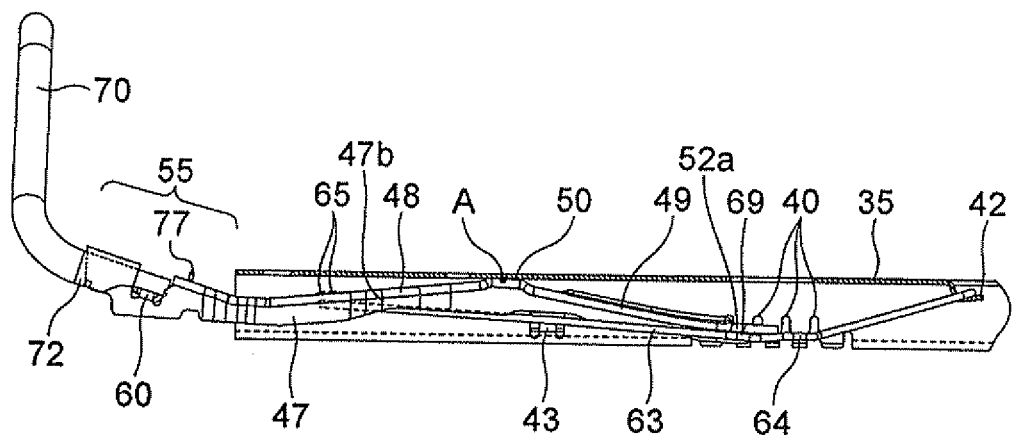
FIG. 9 is a side view similar to that of FIG. 8 in an unlocked state.

The rail-incorporated portion 47*a* of the lock release lever 47 is accommodated in the lever accommodating groove 37 of the associated upper rail 35, and the rotational contact protrusion 50 is in contact with a roof surface of the base 36 (see a contact portion "A" in FIGS. 8 and 9; an interspace is formed between the upper surface of the rail-incorporated portion 47*a* except the rotational contact protrusion 50 and a roof surface of the lever accommodation groove 37). As shown in FIGS. 7 through 9, the rear end of the lock spring 63 is lock-engaged with the locking lug 42 (see the triangular mark in FIG. 8), portions of the lock spring 63 which are slightly in front of the lock portions 64 are lock-engaged with the left and right locking lugs 43 (see a triangular mark in FIG. 8), each lock portion 64 is lock-engaged with the associated guide groove 40 from below, and the left and right pair of front-end locking lugs 65 are inserted into the lock-spring catching hole 53 from below; moreover, portions of the left and right lever pressing portions 66 in the vicinity of the front ends thereof are lock-engaged with the rear edge of the lock-spring catching hole 53, and the spring-hook grooves 52 are lock-engaged with portions of the lock spring 63 from above which are positioned between the pair of lock portions 64. Installation of the lock spring 63 to the upper rail 35 and lock release lever 47 in this manner puts the lock spring 63 in a state of being substantially prevented from moving in the forward/rearward direction with respect to the upper rail 35 (the lock spring 63 can move within a minute moving range in which the locking engagement between the lock spring 63 and the locking lug 42 is not released and the front-end locking lugs 65 are prevented from coming out of the lock-spring catching hole 53 or are totally prevented from moving forward or rearward), and left and right portions (front half portions) of the lock spring 63 are respectively positioned in a left and right pair of spaces formed between the side walls 51 of the narrow-width portion 49 and the pair of side wall portions 36*b* of the upper rail 35 (see FIG. 7). In addition, the lock spring 63 that is accommodated in the lever accommodation groove 37 produces an upward biasing force (elastic force) by being elastically deformed (see arrows ↑ shown in FIG. 8), and accordingly, this biasing force causes the rotational contact protrusion 50 of the lock release lever 47 to be pressed against the roof portion 36*a* of the base 36, which allows the lock release lever 47 to rotate about the rotational contact protrusion 50 (about an imaginary rotation axis in the leftward/rightward direction) about the contact portion A between the roof portion 36a and the rotational contact protrusion 50, and the lock release lever 47 is held in the lock position shown in FIG. 8 when no upward external force is exerted on the connecting portion 55. On the other hand, exerting an upward external force on the connecting portion 55 against the biasing force of the lock spring 63 causes the lock lever 47 to rotate to the unlock position shown in FIG. 9. Thereupon, the spring-hook grooves 52 of the lock release lever 47 depresses the portions of the lock spring 63 which are positioned between the pair of lock portions 64, so that each lock portion 64 escapes downward from the associated guide groove 40 (see FIG. 9 and imaginary lines shown in FIG. 11).

Figure 5:
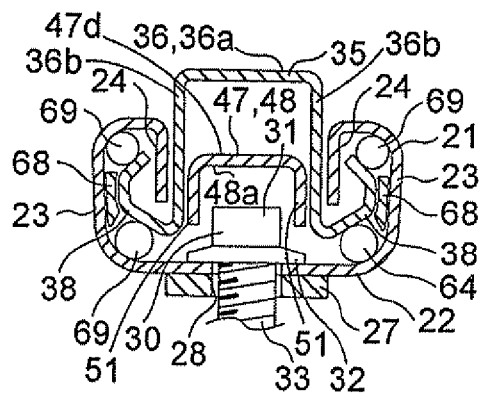
FIG. 5 is a sectional view taken along the line V-V shown in FIG. 1.

An assembly made by inserting a combination of one upper rail 35, one lock release lever 47 and one lock spring 63, which are combined together in the above described manner, into one lower rail 21 from the front or rear end opening of the lower rail 21 constitutes one rail unit 20. When one rail unit 20 is assembled, the upright walls 38 and the locking walls 39 of the upper rail 35 enter the spaces formed between the outer wall portions 23 and the inner wall portions 24 as shown in FIG. 5, and a plurality of bearing balls 69 which are rotatably supported by retainers 68 installed in the aforementioned spaces are in rotatable contact with both outer surfaces of the upright walls 38 and inner surfaces of the outer wall portions 23, which allows the upper rail 35 (and the lock release lever 47 and the lock spring 63) to slide in the forward/rearward direction with respect to the lower rail 21.

Figure 11:
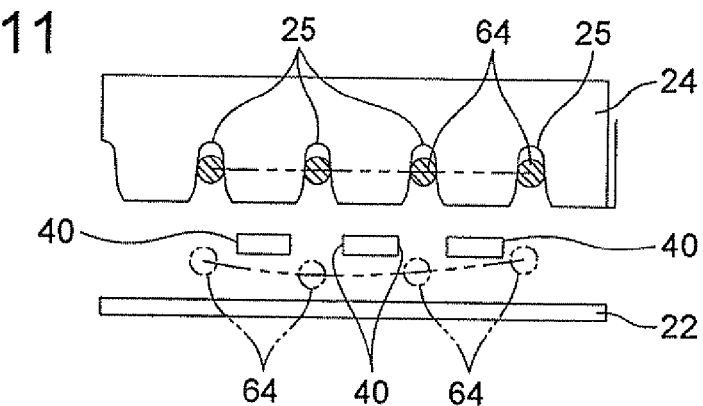
FIG. 11 is a schematic side view showing a state where one lock spring is in a lock position and another state where the same lock spring is in an unlock position.

In addition, when the lock release lever 47 is in the lock position, the upper rail 35 is prevented from sliding with respect to the lower rail 21 because each lock portion 64 is engaged with the associated lock groove 25 from below as shown by solid lines in FIGS. 8, 10 and 11. On the other hand, rotating the lock release lever 47 down to the unlock position causes each lock portion 64 which is engaged with some of the lock grooves 25 to be disengaged downward therefrom, which allows the upper rail 35 to slide with respect to the lower rail 21 (see FIG. 9 and imaginary lines shown in FIG. 11).

The left and right pairs of rail units 20 thus assembled are made to be parallel to each other and the positions thereof in the forward/rearward direction are made to coincide with each other (the sliding positions of the upper rails 35 with respect to the lower rails 21 are also made to coincide with each other); thereafter, the lower surface of the seating portion of the seat 11 is mounted on the top surfaces of the upper rails 35, and the seating portion of the seat 11 is fixed to the left and right upper rails 35 by a plurality of bolts, not shown in the drawings.

After the left and right rail units 20 and the seat 11 are integrated in this manner, a loop handle (handle) 70 is connected to the left and right lock release levers 47 using torsion springs (biaser) 76.

The loop handle 70 is a member made by bending a metal pipe having a circular shape in cross section and is provided with a grip portion 71 and a pair of rear-end connecting portions 72, wherein the grip portion 71 includes a linear portion extending in the leftward/rightward direction and a pair of oblique portions extending obliquely rearwardly downward from both left and right ends of the linear portion while the pair of rear-end connecting portions 72 extend rearward from both left and right ends of the grip portion 71. Depressed portions are formed on the lower surfaces of the left and right rear-end connecting portions 72, and the top surfaces in the depressed portions are formed as lower contact surfaces 73. In addition, lock-engaging grooves 74 which are positioned immediately in front of the lower contact surfaces 73 and extend in the leftward/rightward direction are formed on the lower surfaces of the rear-end connecting portions 72.

Each torsion spring 76 is a substantially bilaterally-symmetrical member made by bending a metal wire rod. An upwardly projecting lug 77 is projected from the rear end of the torsion spring 76, and the front edge of the torsion spring 76 is formed as a front locking portion 78 which extends in the leftward/rightward direction. In addition, a locking projection 79 which projects upward is projected from the rear end of a front half of a side portion of the torsion spring 76, and a locking projection 80 which projects downward is projected from the front end of a rear half of the side portion.

Figure 12:
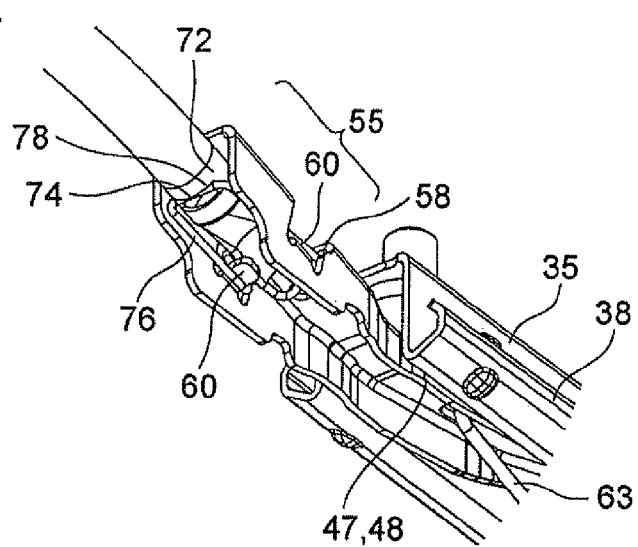
FIG. 12 is an enlarged perspective view of the front ends of one upper rail and the associated lock release lever and a rear end of the loop handle, viewed from below.
Figure 13:
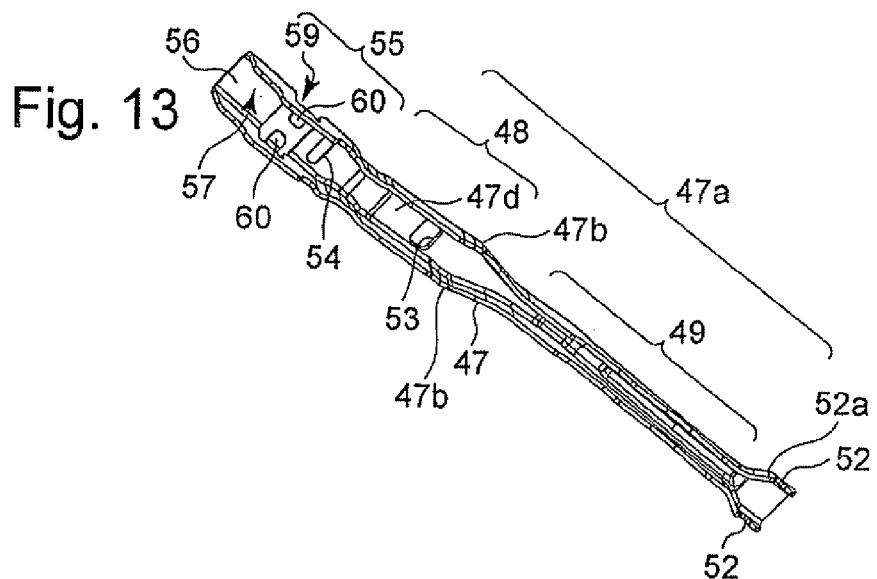
FIG. 13 is a perspective view of one lock release lever, viewed from below.
Figure 14:
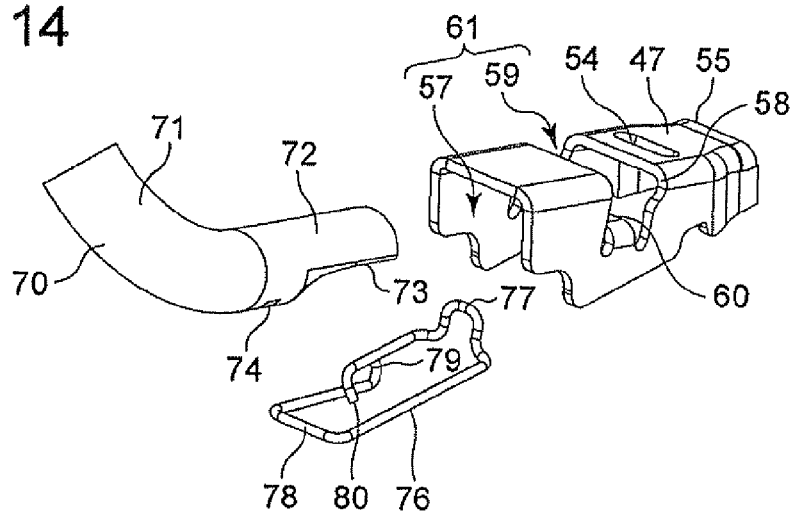
FIG. 14 is an enlarged exploded perspective view of the front end of one lock release lever, a biasing spring and a rear end of the loop handle.
Figure 15:
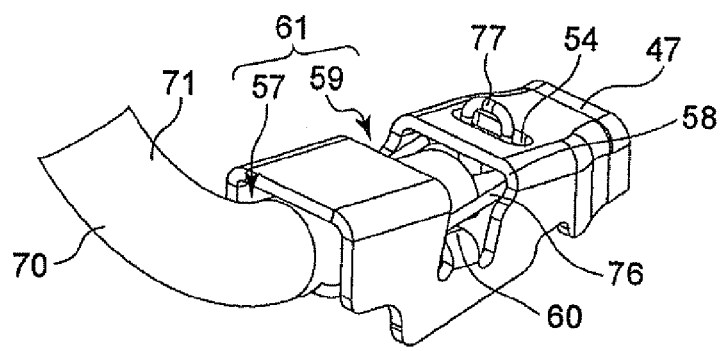
FIG. 15 is an enlarged perspective view of the front end of one lock release lever, the biasing spring and a rear end of the loop handle in a mutually combined state.

To connect the loop handle 70 and the torsion springs 76 to the lock release levers 47, first the torsion springs 76 are inserted into the connecting spaces 61 of the left and right lock release levers 47, respectively, the torsion springs 76 are prevented from moving in the forward/rearward direction with respect to the connecting portions 55 by insertion of the upwardly projecting lugs 77 into the spring locking holes 54 from below, respectively; furthermore, a middle portion of a side part (the right-hand side part of one torsion spring 76 in the case of the right torsion spring 76, and the left-hand side part of one torsion spring 76 in the case of the left torsion spring 76) of one torsion spring 76 is mounted on the top surface (the rear limit portion 60a) of one rear limit lug 60 (the right-hand side rear limit lug 60 in the case of the right connecting portion 55, and the left-hand side rear limit lug 60 in the case of the left connecting portion 55), and the locking projection 79 of the other side part (the left-hand side part of one torsion spring 76 in the case of the right torsion spring 76, and the right-hand side part of one torsion spring 76 in the case of the left torsion spring 76) is lock-engaged with the rear edge of the other rear limit lug 60 (the left-hand side rear limit lug 60 in the case of the right connecting portion 55, and the right-hand side rear limit lug 60 in the case of the left connecting portion 55) from below while the locking projection 80 of the other side part is lock-engaged with the front edge of the other rear limit lug 60 from above (see FIGS. 12, 14 and 15). Subsequently, the left and right rear-end connecting portions 72 of the loop handle 70 are inserted into the left and right connecting spaces 61, respectively, the rear of each rear-end connecting portion 72 is inserted into the space between the left and right side parts of the associated torsion spring 76, and the lock-engaging grooves 74 are lock-engaged with the front locking portions 78.

Figure 16:
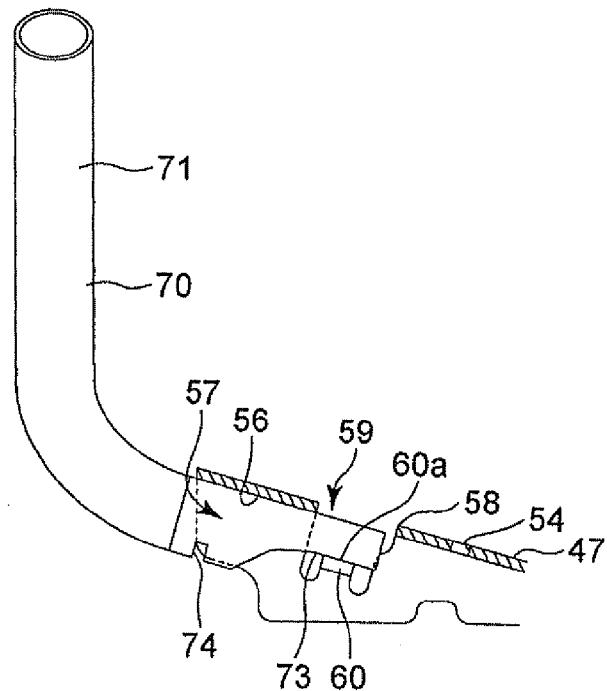
FIG. 16 is an enlarged longitudinal sectional side view of a rear end of the loop handle and the front end of the associated lock release lever with the biasing spring omitted.
Figure 17:
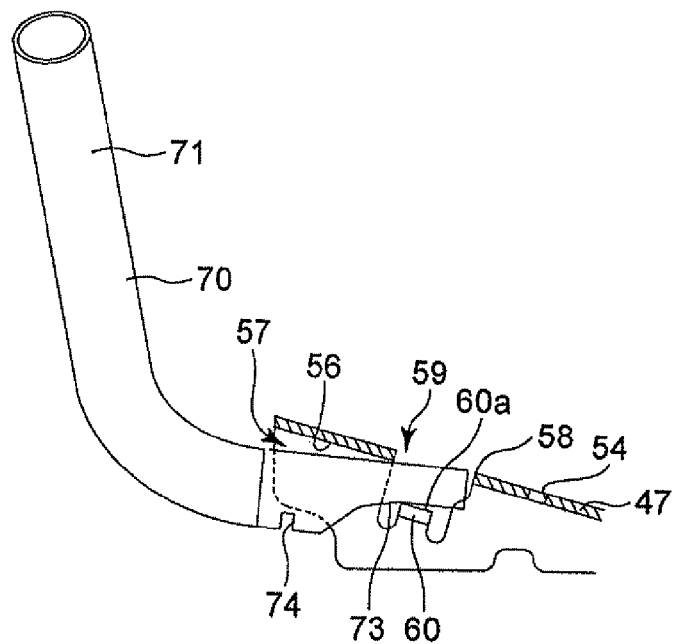
FIG. 17 is a view similar to that of FIG. 16 when the loop handle is depressed.
Figure 18:
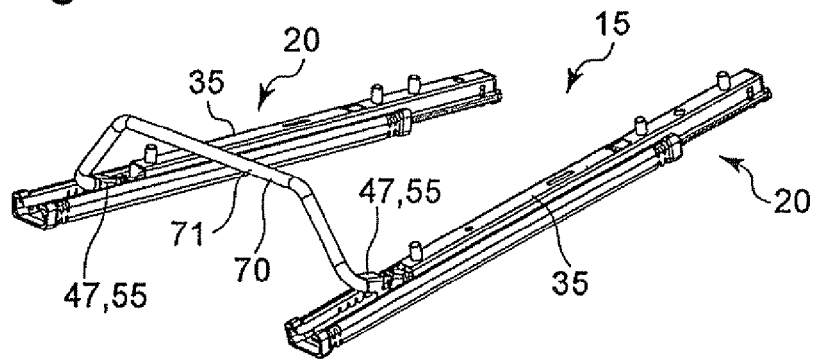
FIG. 18 is a view similar to that of FIG. 2 when the rear end of a right rail unit has moved upward compared with the front end thereof due to a collision of another vehicle with the vehicle equipped with the slide seat device.
Figure 19:
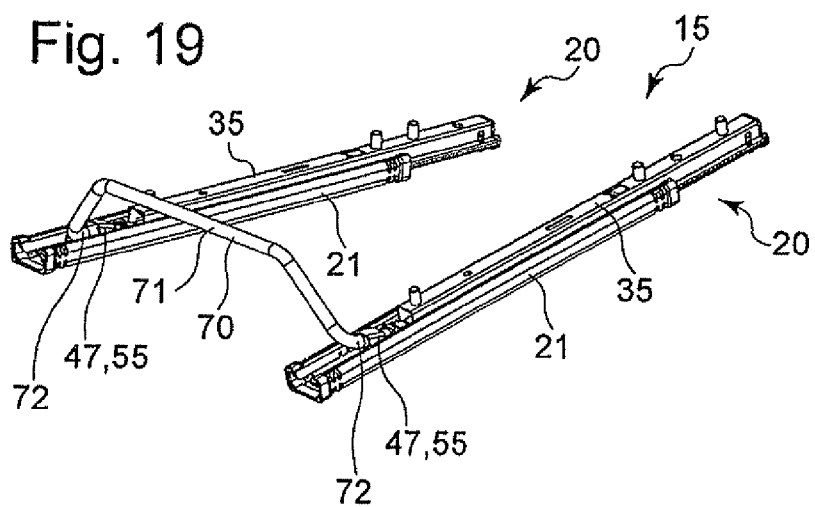
FIG. 19 is a view similar to that of FIG. 18 when the rear end of the right rail unit has further moved upward compared with the front end thereof.

Upon the slide seat device 10 being assembled by combining the loop handle 70 and the torsion springs 76 with the left and right rail units 20, the front of each torsion spring 76 (portions thereof in front of the rear limit lugs 60) are resiliently slightly deformed downward by the rear-end connecting portions 72, and accordingly, an upward biasing force (elastic force) produced by the front of each torsion spring 76 causes the front of each top surface of the rear-end connecting portions 72 to come in contact with the front limit portions 56 and causes the lower contact surfaces 73 to come in contact with the rear limit portions 60a of the rear limit lugs 60 (see FIG. 16). If an occupant manually holds and rotates the entire loop handle 70 upward by hand after the loop handle 70 is connected to the lock release levers 47 (the connecting portions 55), this rotational force is exerted on the front limit portions 56 and the rear limit portions 60a from the rear-end connecting portions 72 to rotate the lock release levers 47 (the connecting portions 55) upward with the rear-end connecting portions 72, so that the lock release levers 47 in the lock position can be rotated to the unlock position. On the other hand, rotating the entire loop handle 70 downward causes the left and right rear-end connecting portions 72 to rotate with engaging portions thereof with the front locking portions 78 as fulcrums (causes the rears of the rear-end connecting portions 72 to rotate upward in the rear allowance spaces 59 and causes the fronts of the rear-end connecting portions 72 to rotate downward in the front allowance spaces 57) to move away from the front limit portions 56 and the rear limit portions 60a (see FIG. 17), and therefore, this rotational force is not transmitted from each rear-end connecting portion 72 to the associated lock release lever 47 (the connecting portion 55 thereof) (neither the left or right lock release levers 47 rotate).

After fitting the lower halves of the positioning pins P, shown in FIGS. 1, 3 and 4, into the positioning holes F2 of the floor board F, the positioning holes 22b of the left and right lower rails 21 of the slide seat device 10 are respectively fitted onto the tops of the positioning pins P which project upward from the floor board F, thereby causing the lower surfaces of the spacers 27 that are fixed to the left and right lower rails 21 to come into contact with upper surfaces of the floor board F and causes each bolt insertion hole 22a and each through-hole 28 to be positioned immediately above the associated screw hole F1. Accordingly, the slide seat device 10 is fixed to the floor board F if each threaded portion 33 is made to be screw-engaged into the associated screw hole F1 so that the lower surfaces of the heads 31 of the fixing bolts 30 come into pressing contact with an upper surface of the bottom wall 22.

Figure 2:
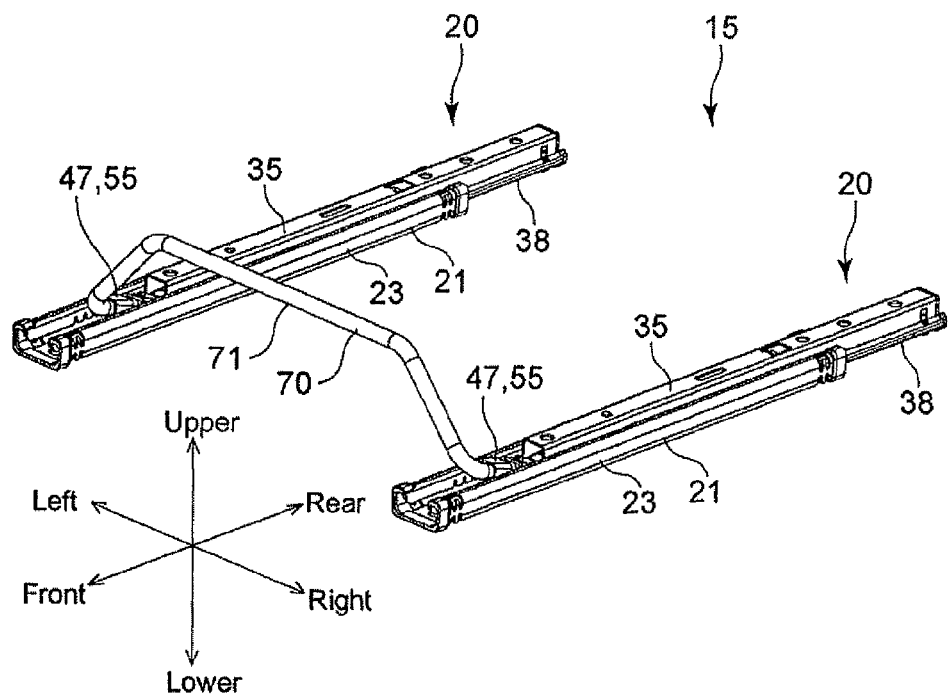
FIG. 2 is a front perspective view of the slide rail device, viewed obliquely from above.

The left and right upper rails 35 are rearwardly slidable to the rear end position shown in FIG. 2 with respect to the lower rails 21 and slidable forward to the front end position shown in FIG. 1 with respect to the lower rails 21. Although the heads 31 of the front and rear fixing bolts 30 and the middle portions 48 are positioned at the same height (the side walls 51 of the middle portions 48 overlap the heads 31 in the vertical direction) when the lock release levers 47 are in the lock position as shown in FIG. 5, the entire lock release levers 47 are positioned between the front and rear fixing bolts 30 (the heads 31 thereof) when the upper rails 35 are in the rear end position; therefore, the front and rear heads 31 and the lock release levers 47 do not interfere with each other. On the other hand, even if the lock release levers 47 are brought back to the lock position after the positions of the middle portions 48 and the front heads 31 in the forward/rearward direction are made to coincide with each other by sliding the lock release levers 47 to the front end position, the heads 31 of the front fixing bolts 30 are positioned in the receptive depressed portions 48a of the middle portions 48 as shown in FIG. 5, so that the middle portions 48 and the heads 31 do not interfere with each other. Since the formation of the receptive depressed portions 48a on the lock release levers 47 prevents the heads 31 of the fixing bolts 30 and the lock release levers 47 from interfering with each other, the lock release levers 47 can be disposed near the bottom walls 22 of the lower rails 21, and hence, a reduction in dimensions of the rail units 20 can be achieved.

Since the lower surfaces of the connecting portions 55 are positioned above the heads 31 even if the lock release levers 47 are brought back to the lock position after the positions of the connecting portions 55 and the heads 31 of the front bolts 30 in the forward/rearward direction are made to coincide with each other by sliding the upper rails 35 slightly rearward from the front end positions thereof, the heads 31 and the lock release levers 47 do not interfere with each other in this case also.

Additionally, even if the metal plate that constitutes a base material of each lock release lever 47 is thin, the lock release levers 47 can have a high mechanical strength because each lock release lever 47 has an inverted U-shaped cross section that includes the pair of side walls 51.

Moreover, the lock release levers 47 are prevented from deflecting left and right with respect to the upper rails 35 by each ridge 47b and 52a (portions of the side walls 51) because the ridges 47b and 52a, which are formed on the left and right side walls 51 of the lock release levers 47, face inner surfaces of the left and right side wall portions 36b so as to be contactable therewith with minute clearance therebetween.

Additionally, the rotation support structure for each lock release lever 47 with respect to the associated upper rail 35 has a small number of components and is simple in structure because the upper rails 35 are not provided with rotational shafts for rotatably supporting the associated lock release levers 47.

Additionally, the rotation support structure for the loop handle 70 (the rear-end connecting portions 72) with respect to the connecting portions 55 also has a small number of components and is simple in structure because the connecting portions 55 of the lock release levers 47 are also not provided with rotational shafts for rotatably supporting the rear-end connecting portions 72 of the loop handle 70.

In the case where another vehicle collides with the present vehicle, if the rear of the right lower rail 21 (the portion thereof which is fixed to the floor board F by one fixing bolt 30) is raised upward while deforming the aforementioned portion of the floor board F upward (if the rear end of the right lower rail 21 moves higher than the front end thereof), the front of the right lock release lever 47 moves (rotates) lower than the rear thereof, so that this downward moving force is transmitted from the aforementioned lock release lever 47 to the right rear-end connecting portion 72 of the loop handle 70. Thereupon, the left rear-end connecting portion 72 moves (rotates) with the right rear-end connecting portion 72; however, the left rear-end connecting portion 72 rotates downward relative to the left lock release levers 47 (the connecting portion 55 thereof), so that the moving force (rotational force) of the left rear-end connecting portion 72 is not transmitted to the left lock release lever 47. Therefore, the locked state of the left rail unit 20 by the left lock spring 63 is maintained, so that the seat 11 (the upper rails 35) does not unexpectedly slide with respect to the lower rails 21, which is safe.

Although the present invention has been described based on the above illustrated embodiment, various modifications can be made to the above illustrated embodiment.

Figure 20:
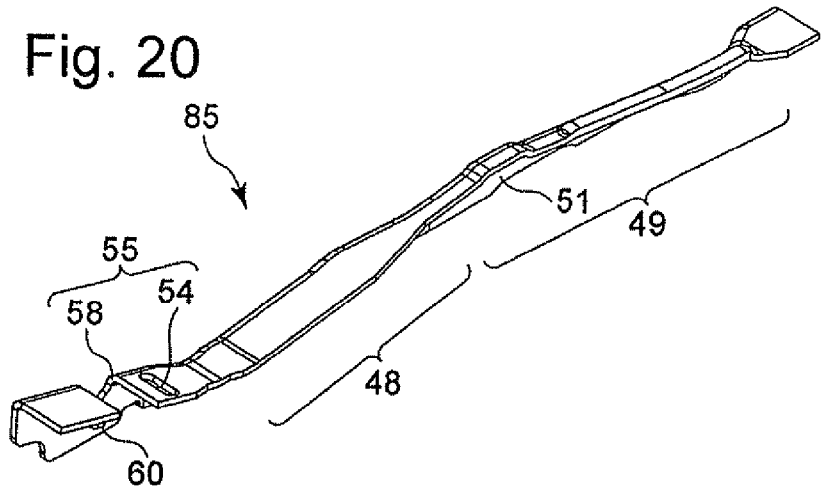
FIG. 20 is a perspective view of a modified embodiment of one lock release lever, viewed obliquely from above.
Figure 21:
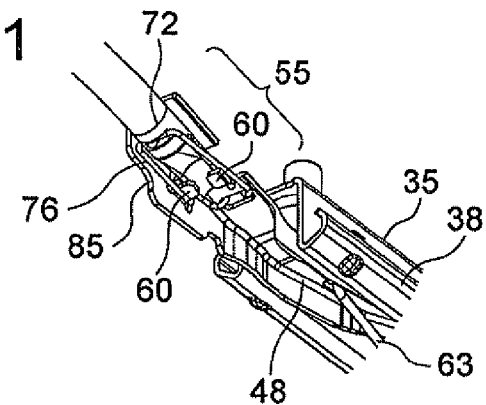
FIG. 21 is an enlarged perspective view similar to that of FIG. 12, showing the same lock release lever.
Figure 22:
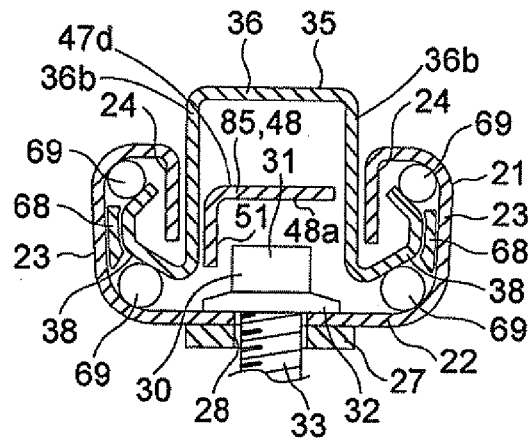
FIG. 22 is a sectional view similar to that of FIG. 5, showing the same lock release lever.

For instance, a lock release lever 85 shown in FIGS. 20 through 22 can be adopted. The lock release lever 85 is in the shape of a substantially letter L in cross section and identical in structure to the lock release lever 47 from which one side wall 51 thereof is omitted. In this case also, even if the lock release levers 85 are brought back to the lock position after the positions of the middle portions 48 and the front heads 31 in the forward/rearward direction are made to coincide with each other by sliding the lock release levers 85 to the front end position, the heads 31 of the front fixing bolts 30 are positioned in the receptive depressed portions 48a of the middle portions 48 as shown in FIG. 22, so that the middle portions 48 and the heads 31 do not interfere with each other. Additionally, even if the metal plate that is provided as a base material of each lock release lever 85 is thin, the lock release levers 85 can have a high mechanical strength because each lock release lever 85 includes a side wall 51 on either the left or right side.

Figure 23:
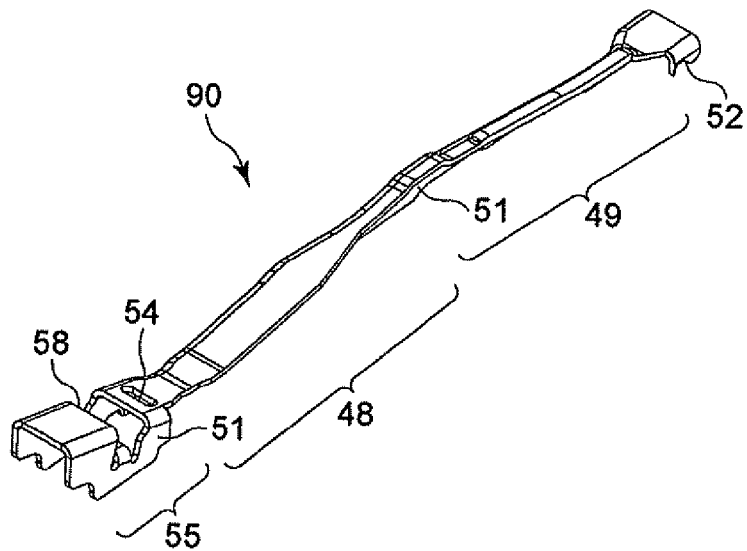
FIG. 23 is a perspective view of another modified embodiment of one lock release lever, viewed obliquely from above.

Additionally, as shown in FIG. 23, a lock release lever 90 in which one side wall 51 except both front and rear ends thereof are removed can be adopted.

Figure 24:
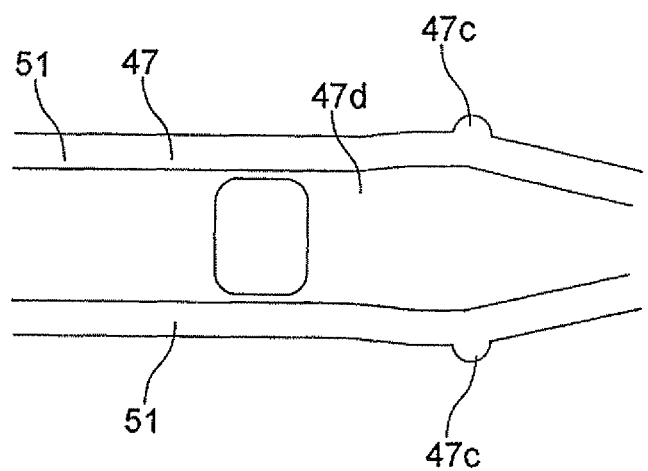
FIG. 24 is an enlarged bottom view of a portion of yet another modified embodiment of one lock release lever in the vicinity of the joint between a middle portion and a narrow-width portion of the lock release lever.

Additionally, as shown in FIG. 24, instead of the ridges 47b and 52a, for instance, ribs 47c (ribs as substitutes for the ridges 52a are not shown in the drawings) that are substantially semi-cylindrical in shape can be formed on the left and right side walls 51 of each lock release lever 47 (or the left and right side walls of the lock release lever 85 or 90). The effect of deflecting left and right of the lock releases lever 47 (85, 90) with respect to the upper rails 35 is further improved if the ribs 47c of this kind are made to face inner surfaces of the left and right side wall portions 36b of the upper rails 35 so as to be contactable therewith with a minute clearance therebetween.

Additionally, the means for fixing the lower rails 21 to the floor board F is not limited to the fixing bolts 30; for instance, rivets (not shown) can be used instead. In this case, the lower rails 21 are mounted on a bracket (not shown; which constitutes a part of the floor board F) which is fixed to the floor board F, and the bottom walls 22 of the lower rails 21 and the bracket are fixed to each other by rivets. Thereafter, upon the lock release lever 47, 85 or 90 being brought back to the lock position after the positions of the middle portion 48 and projections of the rivets (upper ends of the rivets that project upward from the bottom wall 22) in the forward/rearward direction are made to coincide with each other, the aforementioned projections are to be positioned in the receptive depressed portion 48a.

INDUSTRIAL APPLICABILITY

In the slide rail device for vehicle according to the present invention, the rotation support structure for the lock release lever with respect to the upper rail has a small number of components and is simple in structure because the upper rail is not provided with a rotational shaft for rotatably supporting the lock release lever.

REFERENCE SIGNS LIST

10 Slide seat device
11 Seat
15 Slide rail device
20 Rail unit
21 Lower rail
22 Bottom wall
22a Bolt insertion hole
22b Positioning hole
23 Outer wall portion
24 Inner wall portion
25 Lock groove
27 Spacer
28 Through-hole
30 Fixing bolt (fixing member)
31 Head (projecting portion)
32 Flange
33 Threaded portion
35 Upper rail
36 Base
36a Roof portion
36b Side wall portion
37 Lever accommodating groove
38 Upright wall
39 Locking wall
40 Guide groove
42 43 Locking lug
47 Lock release lever
47a Rail-incorporated portion
47b Ridge
47c Rib
47d Base wall
48 Middle portion
48a Receptive depressed portion
49 Narrow-width portion
50 Rotational contact protrusion (rotational contact portion)
51 Side wall
52 Spring-hook groove (first engaging portion)
52b Ridge
53 Lock-spring catching hole (second engaging portion)
54 Spring locking hole
55 Connecting portion
56 Front limit portion (rotation limit portion)
57 Front allowance space (rotation allowance space)
58 Depressed portion
59 Rear allowance space (rotation allowance space)
60 Rear limit lug
60a Rear limit portion (rotation limit portion)
61 Connecting space
63 Lock spring (biaser)
64 Lock portion
65 Front-end locking lug
66 Lever pressing portion
68 Retainer
69 Bearing ball
70 Loop handle (handle)
71 Grip portion
72 Rear-end connecting portion
73 Lower contact surface
74 Lock-engaging groove
76 Torsion spring (biaser)
77 Upwardly projecting lug
78 Front locking portion (locking portion)
79 80 Locking projection
85 Lock release lever
90 Lock release lever
A Contact portion
F Floor board
F1 Screw hole
F2 Positioning hole
N Weld nut
P Positioning pin

The invention claimed is:

1. A slide rail device for a vehicle comprising:
a lower rail which extends in a forward/rearward direction;
an upper rail which is supported by said lower rail to be slidable in said forward/rearward direction;
a locking mechanism which is provided between said upper rail and said lower rail and restricts or releases a restriction on sliding of said upper rail;
a lock release lever which switches said locking mechanism between a slide restriction state and a slide restriction release state by rotating in a vertical direction and includes a rail-incorporated portion positioned between said upper rail and a bottom wall of said lower rail;
a rotational contact portion which is formed on an upper surface of said rail-incorporated portion, contacts a roof surface of said upper rail and rotatably supports said lock release lever; and
a biaser which is installed in said rail-incorporated portion and said upper rail, said biaser biasing said rotational contact portion toward said roof surface.

2. The slide rail device for a vehicle according to claim 1, wherein said rotational contact portion comprises a protrusion which protrudes upward.

3. The slide rail device for a vehicle according to claim 1, wherein said locking mechanism comprises:
a plurality of lock grooves which are formed in said lower rail and aligned in said forward/rearward direction; and a lock portion which is engaged in any one of said lock grooves when said lock release lever is in a lock position and escapes from said lock groove when said lock release lever is in an unlock position.

4. The slide rail device for a vehicle according to claim 3, wherein said biaser comprises a lock spring including said lock portion.

5. The slide rail device for a vehicle according to claim 1, wherein said biaser comprises a torsion spring, wherein said torsion spring prevents said lock release lever from moving forward and rearward relative to said upper rail.

6. The slide rail device for a vehicle according to claim 5, wherein said torsion spring comprises a lock portion which is engaged in any one of a plurality of lock grooves formed in said lower rail to be aligned in said forward/rearward direction when said lock release lever is positioned in a lock position, and said lock portions which escapes from said lock groove when said lock release lever is positioned in an unlock position, and wherein said lock release lever includes a first engaging portion which is engaged with said torsion spring at a portion in the vicinity of said lock portion and a second engaging portion which is engaged with said torsion spring at a portion thereof which deviates from said first engaging portion in said forward/rearward direction.

7. The slide rail device for vehicle according to claim 1, wherein a portion of said rail-incorporated portion is formed as a narrow-width portion which is smaller in width than the surrounding portion of said rail-incorporated portion, and wherein at least part of said biaser is positioned in a space formed between said upper rail and both sides of said narrow-width portion.

\* \* \* \* \*